(12) United States Patent
Jin

(10) Patent No.: US 10,467,939 B2
(45) Date of Patent: Nov. 5, 2019

(54) METHOD FOR DISPLAYING IMAGE AND DISPLAY DEVICE

(71) Applicant: BOE TECHNOLOGY GROUP CO., LTD., Beijing (CN)

(72) Inventor: Xiaodan Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,085

(22) PCT Filed: Jan. 8, 2015

(86) PCT No.: PCT/CN2015/070350
§ 371 (c)(1),
(2) Date: Aug. 19, 2015

(87) PCT Pub. No.: WO2016/045251
PCT Pub. Date: Mar. 31, 2016

(65) Prior Publication Data
US 2017/0193875 A1    Jul. 6, 2017

(30) Foreign Application Priority Data

Sep. 26, 2014    (CN) .......................... 2014 1 0505565

(51) Int. Cl.
*G09G 3/20*    (2006.01)
*G09G 3/3208*    (2016.01)
(Continued)

(52) U.S. Cl.
CPC ............. *G09G 3/2003* (2013.01); *G09G 3/20* (2013.01); *G09G 3/3208* (2013.01); *G09G 3/36* (2013.01);
(Continued)

(58) Field of Classification Search
CPC ...... G09G 3/2003; G09G 3/20; G09G 3/3208; G09G 3/36; G09G 2300/0443; G09G 2300/0452; G09G 2340/06; H04N 1/6008
See application file for complete search history.

(56) References Cited

U.S. PATENT DOCUMENTS 8,319,791 B2 *  11/2012  Ueki ................... G09G 3/2003
                                                        345/590
8,508,449 B2 *   8/2013  Broughton ........... G09G 3/2018
                                                        345/50
(Continued)

FOREIGN PATENT DOCUMENTS

CN        102483898        5/2012
CN        102855837        1/2013
(Continued)

OTHER PUBLICATIONS

Notice of Allowance in Korean Patent Application No. 10-2015-7022648 dated Feb. 24, 2017, with English translation. 3 pages.
(Continued)

*Primary Examiner* — Sejoon Ahn
(74) *Attorney, Agent, or Firm* — Womble Bond Dickinson (US) LLP

(57) ABSTRACT

Embodiments of the invention disclose a method for displaying image and a display device. In the display panel, 2*2 pixels constitute one repeating group, each repeating group contains two pixels composed of a B sub-pixel and a Y sub-pixel and two pixels composed of a R sub-pixel and a G sub-pixel, and sub-pixels included in neighboring pixels in the horizontal or vertical direction within the repeating group are different, thus compared to the existing arrangement in which three or more sub-pixels constitute one pixel, the number of sub-pixels in each pixel is reduced, enabling the resolution of image displayed to be enhanced under the same fabrication precision. And after converting the
(Continued)

received RGB image signal of each pixel of the frame to be displayed into corresponding RG/BY image signal respectively, depending on arrangement of sub-pixels in each pixel of the display panel, image signal corresponding to sub-pixels of each pixel in the display panel is determined based on the RG/BY image signal corresponding to each pixel of the frame to be displayed, then the image is displayed, therefore, normal display can be ensured, image of the frame to be displayed can be rendered better.

4 Claims, 6 Drawing Sheets

(51) Int. Cl.
　　*G09G 3/36*　　　(2006.01)
　　*H04N 1/60*　　　(2006.01)
(52) U.S. Cl.
　　CPC ... *H04N 1/6008* (2013.01); *G09G 2300/0443* (2013.01); *G09G 2300/0452* (2013.01); *G09G 2340/06* (2013.01)

(56) References Cited

U.S. PATENT DOCUMENTS

| | | | | |
|---|---|---|---|---|
| 8,593,595 | B2* | 11/2013 | Park | G02F 1/133514 349/105 |
| 8,803,929 | B2* | 8/2014 | Cok | G09G 5/02 345/613 |
| 2004/0174389 | A1* | 9/2004 | Ben-David | G09G 3/3413 345/694 |
| 2007/0018920 | A1* | 1/2007 | Jo | G09G 3/3225 345/88 |
| 2008/0030660 | A1* | 2/2008 | Roth | G09G 3/3607 349/106 |
| 2009/0141381 | A1 | 6/2009 | Itou et al. | |
| 2009/0160871 | A1* | 6/2009 | Hsu | G09G 3/2003 345/589 |
| 2009/0167779 | A1 | 7/2009 | Inuzuka | |
| 2010/0026728 | A1 | 2/2010 | Miyazaki et al. | |
| 2011/0037929 | A1* | 2/2011 | Roth | G09G 3/3607 349/106 |
| 2011/0157216 | A1* | 6/2011 | Yamazaki | G02F 1/133553 345/596 |
| 2011/0157252 | A1* | 6/2011 | Yamazaki | G02F 1/133555 345/690 |
| 2011/0157503 | A1* | 6/2011 | Chung | G02F 1/133707 349/37 |
| 2011/0159619 | A1* | 6/2011 | Tsuji | H01L 27/1225 438/30 |
| 2012/0133670 | A1* | 5/2012 | Kim | G09G 5/02 345/593 |
| 2012/0307163 | A1 | 12/2012 | Fujine et al. | |
| 2013/0234917 | A1 | 9/2013 | Lee | |
| 2014/0118384 | A1* | 5/2014 | Buckley | G09G 3/3413 345/589 |
| 2015/0138488 | A1 | 5/2015 | Shiomi | |
| 2017/0039992 | A1 | 2/2017 | Mo et al. | |

FOREIGN PATENT DOCUMENTS

| | | |
|---|---|---|
| CN | 102855837 A | 1/2013 |
| CN | 103155026 | 6/2013 |
| CN | 103155026 A | 6/2013 |
| CN | 103699347 | 4/2014 |
| CN | 103887323 | 6/2014 |
| CN | 103928011 | 7/2014 |
| CN | 104269129 | 1/2015 |
| CN | 104269129 A | 1/2015 |
| EP | 1553553 | 7/2005 |
| EP | 1553553 A2 | 7/2005 |
| EP | 2709155 A1 | 3/2014 |
| JP | 2000330523 | 11/2000 |
| JP | 2009157127 A | 7/2009 |
| JP | 2010-771737 A | 12/2010 |
| JP | 2013187187 A | 9/2013 |
| WO | 2011/102343 A1 | 8/2011 |
| WO | WO-2011102343 | 8/2011 |
| WO | WO-2013172400 | 11/2013 |

OTHER PUBLICATIONS

"Supplementary Partial EP Search Report," EP Application No. 15748149.0 (dated Feb. 21, 2018).
International Search Report and Written Opinion received for PCT Patent Application No. PCT/CN2015/070350, dated Jun. 30, 2015, 16 pages (8 pages of English Translation and 8 pages of Original Document).
International Preliminary Report on Patentability received for PCT Patent Application No. PCT/CN2015/070350, dated Apr. 6, 2017, 13 pages (8 pages of English Translation and 5 pages of Original Document).
European Search Report and Written Opinion received for EP Patent Application No. 15748149.0, dated Jun. 8, 2018, 18 pages.
Chinese Office Action with English Language Translation, dated Mar. 15, 2016, Chinese Application No. 201410505565.5.
Office Action in Korean Patent Application No. 10-2015-7022648 dated Dec. 30, 2016, with English translation. 5 pages.
Office Action in Korean Application No. 10-2015-7022648, with English Translation. 5 pages.
"First office action," JP Application No. 2017-535946 (dated Jan. 4, 2019).
International Search Report and Written Opinion with English Language Translation, dated Jan. 8, 2015, Application No. PCT/CN2015/070350.

* cited by examiner

METHOD FOR DISPLAYING IMAGE AND DISPLAY DEVICE

The present application claims the benefit of Chinese Patent Application No. 201410505565.5, filed Sep. 29, 2014, the entire disclosures of which are incorporated herein by reference.

FIELD OF THE INVENTION

The invention relates to technical field of displaying, especially to a method for displaying image and a display device.

BACKGROUND OF THE INVENTION

In existing flat panel display such as light emitting diode (LED) display, organic light emitting diode (OLED) display, plasma display panel (PDP) and liquid crystal display (LCD), as shown in FIG. 1, there is provide with a plurality of sub-pixels of different color arranged in array. In general, three sub-pixels of different color constitute one pixel (as shown by the heavy line in FIG. 1), in which the different color includes red (R), green (G) and blue (B). Alternatively, four or more sub-pixels of different color constitute one pixel. In case each pixel in the flat panel display contains three sub-pixels of different color, if a RGB signal is inputted for sub-pixels in each pixel within displaying time of one frame, the image will be displayed by the flat panel display on the basis of a resolution determined by the size of pixel.

At present, with the increasing requirement for resolution of image displayed by the flat panel display, in general, to enhance resolution of image displayed by the flat panel display, the pixel size is reduced. However, as the pixel size becomes smaller, difficulty of the process for fabricating the flat panel display is higher. Therefore, resolution of the image displayed by the flat panel display can not be enhanced by solely reducing the pixel size, it is required to seek a new method for enhancing resolution of image displayed by the flat panel display.

Hence, it is a problem to be solved by the skilled person in the art how to effectively enhance resolution of image displayed by the flat panel display without affecting normal display.

SUMMARY OF THE INVENTION

In view of this, embodiments of the invention provide a method for display image and a display device, so as to effectively enhance resolution of image displayed by the flat panel display without affecting normal display.

An embodiment of the invention provides a method for displaying image, comprising:

converting a received RGB image signal of each pixel of a frame to be displayed into corresponding RG/BY image signal respectively;

determining image signal corresponding to sub-pixels in each pixel of a display panel based on the RG/BY image signal corresponding to each pixel of the frame to be displayed, depending on an arrangement of sub-pixels in each pixel of the display panel; wherein in the display panel, 2*2 pixels constitute a repeating group, each repeating group comprises two pixels composed of a B sub-pixel and a Y sub-pixel as well as two pixels composed of a R sub-pixel and a G sub-pixel, and sub-pixels included in neighboring pixels in a horizontal or vertical direction are different;

sending the determined image signal corresponding to sub-pixels in each pixel of the display panel to the display panel for displaying.

In an embodiment, in above method provided by the embodiment of the invention, the step of converting a received RGB image signal of each pixel of a frame to be displayed into corresponding RG/BY image signal respectively comprises computing the RG/BY image signal by the following formulas:

$$R\_O=R,\ G\_O=G,\ B\_O=B,\ Y\_O=\min(R,G);$$

wherein R represents a value of the received R image signal of each pixel of the frame to be displayed; G represents a value of the received G image signal of each pixel of the frame to be displayed; B represents a value of the received B image signal of each pixel of the frame to be displayed; R_O represents a value of the converted R image signal of each pixel, G_O represents a value of the converted G image signal of each pixel, B_O represents a value of the converted B image signal of each pixel, Y_O represents a value of the converted Y image signal of each pixel.

In an embodiment, in above method provided by the embodiment of the invention, the two sub-pixels in each pixel of the display panel may be arranged in the horizontal direction or diagonal direction.

In an embodiment, in above method provided by the embodiment of the invention, when the two sub-pixels in each pixel of the display panel are arranged in the horizontal direction, the step of determining image signal corresponding to sub-pixels in each pixel of a display panel based on the RG/BY image signal corresponding to each pixel of the frame to be displayed comprises:

in the pixel composed of a R sub-pixel and a G sub-pixel of each repeating group, image signal corresponding to the R sub-pixel equals to corresponding converted R image signal of the pixel in the frame to be displayed, image signal corresponding to the G sub-pixel equals to corresponding converted G image signal of the pixel in the frame to be displayed;

in the pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel in the repeating group.

In an embodiment, in above method provided by the embodiment of the invention, when the two sub-pixels in each pixel of the display panel are arranged in the diagonal direction, the step of determining image signal corresponding to sub-pixels in each pixel of a display panel based on the RG/BY image signal corresponding to each pixel of the frame to be displayed comprises:

in the pixel composed of a R sub-pixel and a G sub-pixel of each repeating group, image signal corresponding to the G sub-pixel equals to corresponding converted G image signal of the pixel in the frame to be displayed, image signal corresponding to the R sub-pixel equals to a mixing value of corresponding converted R image signal of the pixel in the frame to be displayed and R image signal in the RGB image signal of the original pixel in the frame to be displayed corresponding to a pixel adjacent to that pixel comprising the R sub-pixel in the repeating group;

in the pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel in the repeating group.

An embodiment of the invention also provides a display device comprising a display panel and a driving device, wherein in the display panel, 2*2 pixels constitute a repeating group, each repeating group comprises two pixels composed of a B sub-pixel and a Y sub-pixel as well as two pixels composed of a R sub-pixel and a G sub-pixel, and sub-pixels included in neighboring pixels in the horizontal or vertical direction are different; the driving device comprises:

a receiving unit configured to receive a RGB image signal of each pixel of a frame to be displayed;

a converting unit configured to convert the received RGB image signal of each pixel of the frame to be displayed into corresponding RG/BY image signal respectively;

a determining unit configured to determine image signal corresponding to sub-pixels in each pixel of the display panel based on the RG/BY image signal corresponding to each pixel of the frame to be displayed, depending on the arrangement of sub-pixels in each pixel of the display panel;

a sending unit configured to send the determined image signal corresponding to sub-pixels in each pixel of the display panel to the display panel for displaying.

In an embodiment, in above display device provided by the embodiment of the invention, the converting unit is configured to compute the RG/BY image signal by the following formulas:

$$R\_O=R, G\_O=G, B\_O=B, Y\_O=\min(R,G);$$

wherein R represents a value of the received R image signal of each pixel of the frame to be displayed; G represents a value of the received G image signal of each pixel of the frame to be displayed; B represents a value of the received B image signal of each pixel of the frame to be displayed; R_O represents a value of the converted R image signal of each pixel, G_O represents a value of the converted G image signal of each pixel, B_O represents a value of the converted B image signal of each pixel, Y_O represents a value of the converted Y image signal of each pixel.

In an embodiment, in above display device provided by the embodiment of the invention, the two sub-pixels in each pixel of the display panel are arranged in the horizontal direction or diagonal direction.

In an embodiment, in above display device provided by the embodiment of the invention, when the two sub-pixels in each pixel of the display panel are arranged in the horizontal direction, the determining unit determines the image signal corresponding to sub-pixels in each pixel of the display panel as follows:

in the pixel composed of a R sub-pixel and a G sub-pixel of each repeating group, image signal corresponding to the R sub-pixel equals to corresponding converted R image signal of the pixel in the frame to be displayed, image signal corresponding to the G sub-pixel equals to corresponding converted G image signal of the pixel in the frame to be displayed;

in the pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel in the repeating group.

In an embodiment, in above display device provided by the embodiment of the invention, when the two sub-pixels in each pixel of the display panel are arranged in the diagonal direction, the determining unit determines the image signal corresponding to sub-pixels in each pixel of the display panel as follows:

in the pixel composed of a R sub-pixel and a G sub-pixel of each repeating group, image signal corresponding to the G sub-pixel equals to corresponding converted G image signal of the pixel in the frame to be displayed, image signal corresponding to the R sub-pixel equals to a mixing value of corresponding converted R image signal of the pixel in the frame to be displayed and R image signal in the RGB image signal of the original pixel in the frame to be displayed corresponding to a pixel adjacent to that pixel comprising the R sub-pixel in the repeating group;

in the pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel in the repeating group.

Beneficial effects of embodiments of the invention comprise:

For above method for displaying image and display device provided by the embodiments of the invention, based on Hering color opponent-process theory, two pixels are constituted using four kinds of color: red(R), green(G), blue(B) and yellow(Y). And since in the display panel, the repeating group is constituted by 2*2 pixels, each repeating group contains two pixels composed of a B sub-pixel and a Y sub-pixel and two pixels composed of a R sub-pixel and a G sub-pixel, and sub-pixels included in neighboring pixels in the horizontal or vertical direction within the repeating group are different, thus compared to the existing arrangement in which three or more sub-pixels constitute one pixel, the number of sub-pixels in each pixel is reduced, enabling the resolution of image displayed to be enhanced under the same fabrication precision. And after converting the received RGB image signal of each pixel of the frame to be displayed into corresponding RG/BY image signal respectively, depending on arrangement of sub-pixels in each pixel of the display panel, image signal corresponding to sub-pixels of each pixel in the display panel is determined based on the RG/BY image signal corresponding to each pixel of the frame to be displayed, then the image is displayed, therefore, normal display can be ensured, image of the frame to be displayed can be rendered better.

DETAILED DESCRIPTION OF EMBODIMENTS

Next, specific implementations of the method for displaying image and the displaying device provided by embodiments of the invention will be described in detail in conjunction with accompanying drawings.

Figure 1:
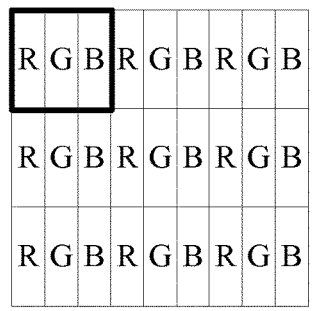
FIG. 1 is a schematic diagram of an arrangement of sub-pixels in existing flat panel display.
Figure 2:
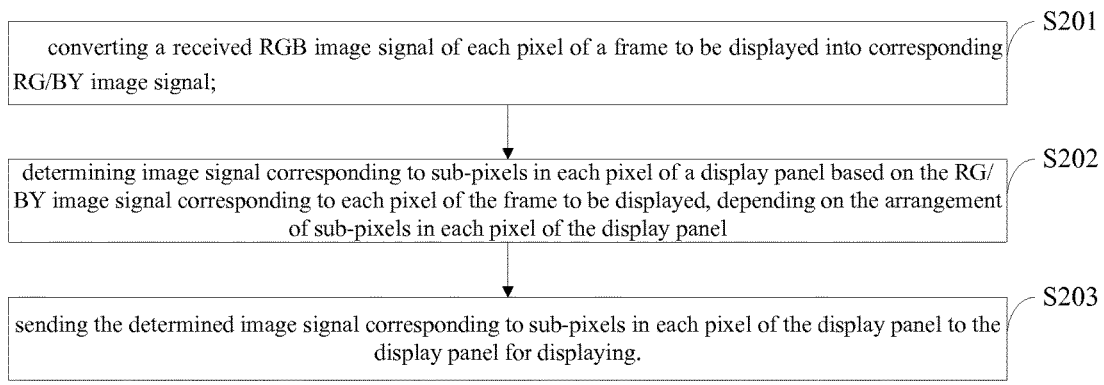
FIG. 2 is a flow diagram of a method for displaying image provided by an embodiment of the invention.

As show in FIG. 2, a method for displaying image provided by an embodiment of the invention, comprises:

S201, converting a received RGB image signal of each pixel of a frame to be displayed into corresponding RG/BY image signal respectively;

S202, determining image signal corresponding to sub-pixels of each pixel of the display panel based on the RG/BY image signal corresponding to each pixel of the frame to be displayed, depending on an arrangement of sub-pixels in each pixel of the display panel; wherein in the display panel, 2*2 pixels constitute a repeating group, each repeating group comprises two pixels composed of a B sub-pixel and a Y sub-pixel, as well as two pixels composed of a R sub-pixel and a G sub-pixel, and sub-pixels included in neighboring pixels in the horizontal or vertical direction are different.

S203, sending the determined image signal corresponding to sub-pixels in each pixel of the display panel to the display panel for displaying.

In the above method for displaying image provided by the embodiment of the invention, based on Hering color opponent-process theory, two pixels are constituted by four kinds of color: red(R), green(G), blue(B) and yellow(Y). And since in the display panel, the repeating group is constituted by 2*2 pixels, each repeating group contains two pixels composed of a B sub-pixel and a Y sub-pixel and two pixels composed of a R sub-pixel and a G sub-pixel, and sub-pixels included in neighboring pixels in horizontal or vertical direction within the repeating group are different, thus compared to the existing arrangement in which three or more sub-pixels constitute one pixel, the number of sub-pixels in each pixel is reduced, enabling the resolution of image displayed to be enhanced under the same fabrication precision. And after converting the received RGB image signal of each pixel of the frame to be displayed into corresponding RG/BY image signal respectively, depending on arrangement of sub-pixels in each pixel of the display panel, image signal corresponding to sub-pixels of each pixel in the display panel is determined based on the RG/BY image signal corresponding to each pixel of the frame to be displayed, then the image is displayed, therefore, normal display can be ensured, image of the frame to be displayed is rendered better.

In specific implementation, in above method for displaying image provided by an embodiment of the invention, since a yellow (Y) image signal is not directly included in the received RGB image signal of each pixel of the frame to be displayed, the minimum among the R image signal and the G image signal can be used as a Y image signal when performing the step S201 to convert the received RGB image signal of each pixel of the frame to be displayed into corresponding RG/BY image signal respectively, thereby using the Y image signal to compensate for the R image signal or the G image signal with relatively low brightness value, so as to increase displaying brightness. In the embodiment, one RG/BY image signal can be obtained from two RGB image signals, i.e. one RGB image signal may generate a RG image signal, the other RBG image signal may generate a BY image signal, and RG/BY image signal can be computed by the following formulas;

$$R\_O = R,\ G\_O = G,\ B\_O = B,\ Y\_O = \min(R, G);$$

wherein R represents a value of the received R image signal of each pixel of the frame to be displayed; G represents a value of the received G image signal of each pixel of the frame to be displayed; B represents a value of the received B image signal of each pixel of the frame to be displayed; R_O represents a value of the converted R image signal of each pixel, G_O represents a value of the converted G image signal of each pixel, B_O represents a value of the converted B image signal of each pixel, Y_O represents a value of the converted Y image signal of each pixel.

Figure 3A:
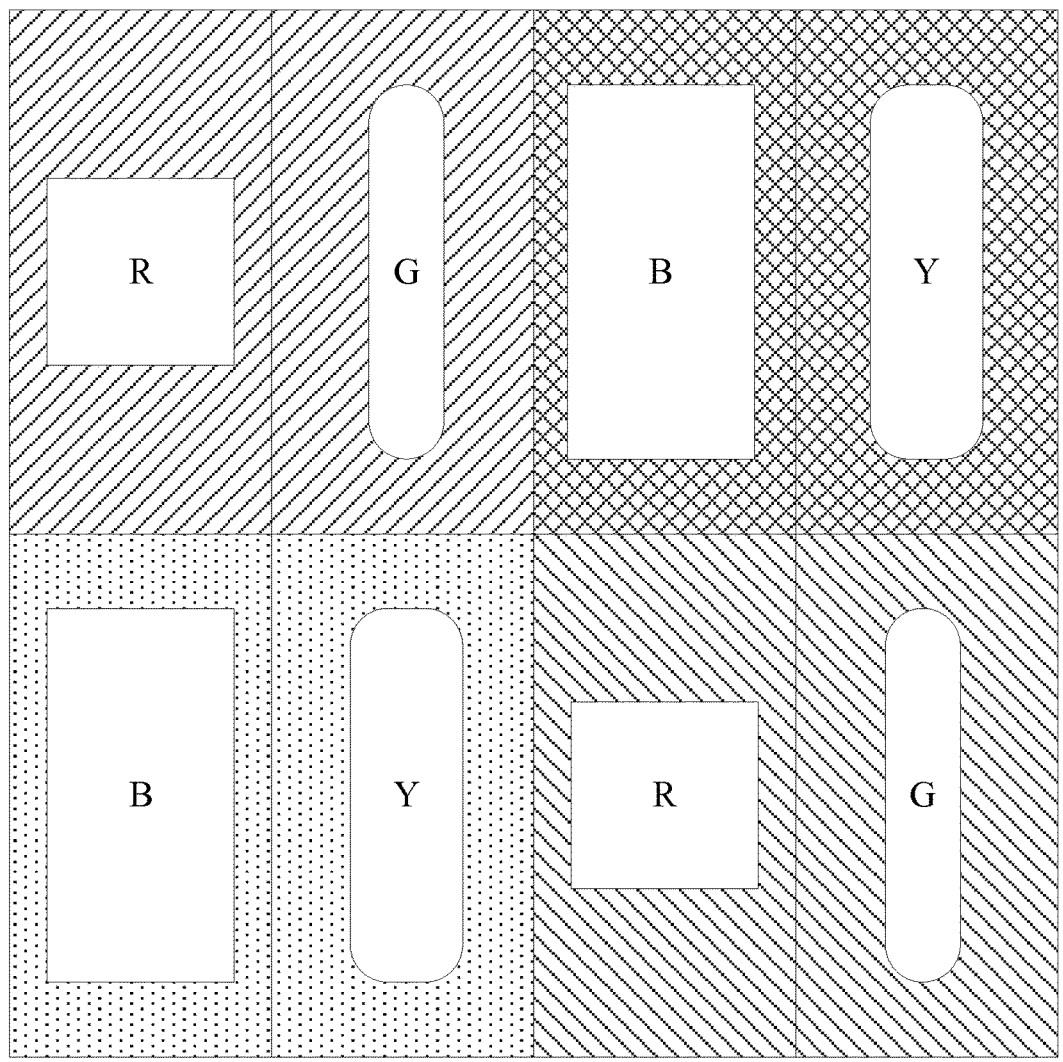
FIG. 3*a* is a schematic diagram of pixel arrangement in a display panel provided by an embodiment of the invention.

In specific implementation, in the above method for displaying image provided by the embodiment of the invention, there may be two kinds of arrangement of sub-pixels in each pixel of the display panel. In one case, the two sub-pixels in each pixel are arranged in the horizontal direction, as shown in FIG. 3*a*, in another case, the two sub-pixels in each pixel are arranged in a diagonal direction. For the pixel structure in which sub-pixels are arranged in the diagonal direction, the number of sub-pixels in the same horizontal line is relatively small compared to the pixel structure with sub-pixels arranged in horizontal direction, thus, requirement for fine metal mask (FFM) can be decreased in fabrication, which is beneficial for production. In other words, with the same precision of FMM, display panel with higher resolution can be fabricated using the pixel arrangement as shown in FIG. 3*b*.

Figure 3B:
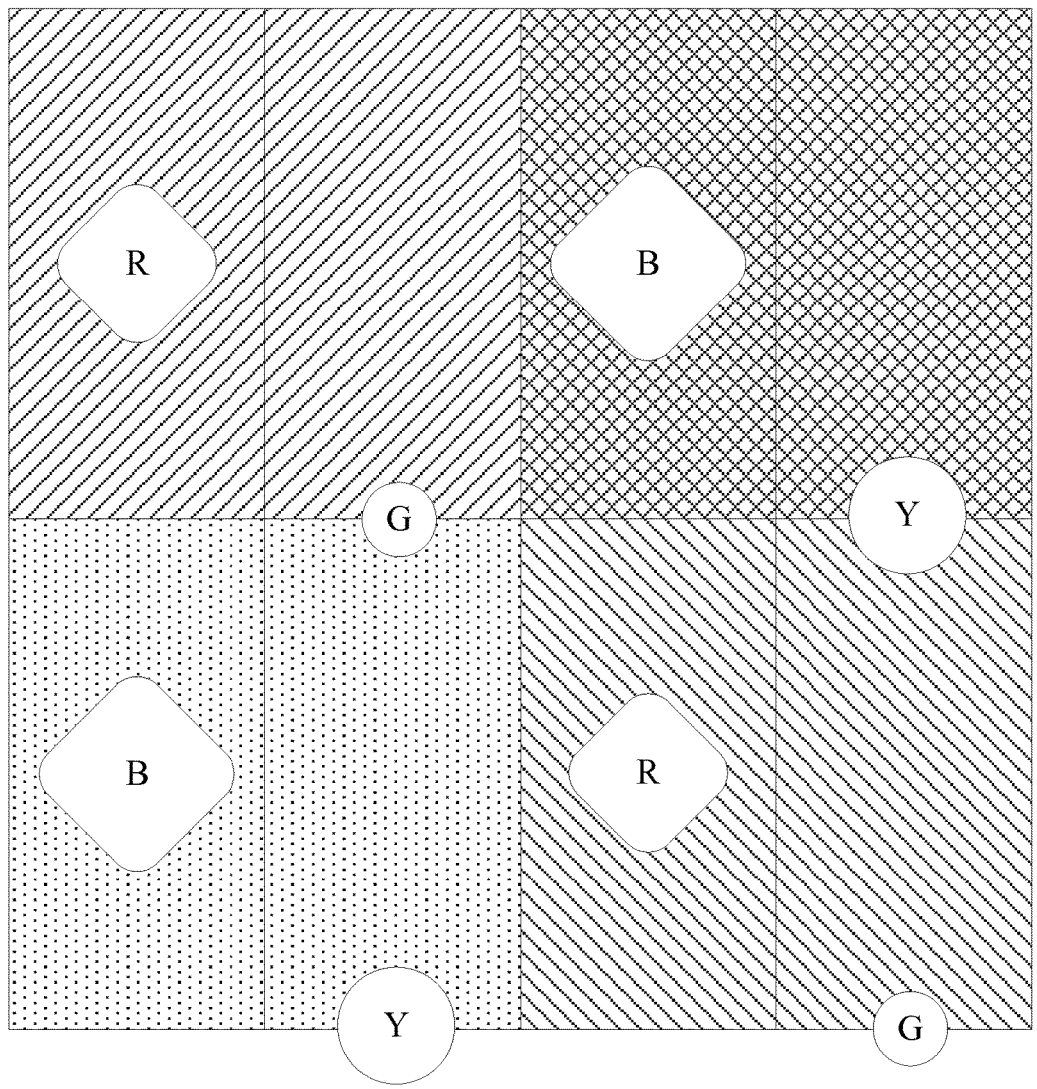
FIG. 3*b* is a schematic diagram of pixel arrangement in a display panel provided by another embodiment of the invention.

It is noted that, in FIGS. 3*a* and 3*b*, only one repeating group consisting of 2*2 pixels is shown, and the left and right pixel in each repeating group can be exchangeable, relative position of the two sub-pixels in each pixel can be exchanged, as long as the condition is satisfied that each repeating group includes two pixels composed of a B sub-pixel and a Y sub-pixel as well as two pixels composed of a R sub-pixel and a G sub-pixel, and sub-pixels included in neighboring pixels in the horizontal or vertical direction within the repeating group are different.

Furthermore, in specific implementation, above method for displaying image provided by the embodiment of the invention can be applied to organic light emitting diode (OLED) display, and can also be applied to liquid crystal display (LCD). The pixel arrangements of FIGS. 3*a* and 3*b* are illustrated for the case in which the method is applied to OLED display. It can be seen that RG/BY light emitting regions corresponding to sub-pixel regions does not fill in the whole sub-pixel regions, and size of the area of RG/BY light emitting regions can be set depending on the light emission efficiency of each light emitting layer. It is considered that in general blue light is the weakest, red light is weaker, green light is stronger, and yellow light is similar to green light, area of light emission region with low light emission efficiency is large. Portions of FIGS. 3*a* and 3*b* that are not filled are used to schematically illustrate respective light emission region, it can be seen that relative sizes of areas of respective light emission regions are as follows: B>=R>Y>=G.

In specific implementation, for the above method for displaying image provided by embodiments of the invention, when performing the step S202, i.e. depending on arrangement of sub-pixels in each pixel of the display panel, determining image signal corresponding to sub-pixels of each pixel of the display panel based on the RG/BY image signal corresponding to each pixel of the frame to be displayed, there may be two ways of determining the image signal corresponding to sub-pixels of each pixel of the display panel depending on arrangement of sub-pixels in each pixel of the display panel.

First, in the case where the two sub-pixels in each pixel of the display panel are arranged in the horizontal direction as shown in FIG. 3*a*, in the pixel composed of a R sub-pixel and a G sub-pixel of each repeating group, image signal corresponding to the R sub-pixel is equal to corresponding converted R image signal of the pixel in the frame to be displayed, image signal corresponding to the G sub-pixel is equal to corresponding converted G image signal of the pixel in the frame to be displayed; in the pixel composed of a B sub-pixel and a Y sub-pixel of each repeating group, image signal corresponding to the Y sub-pixel is equal to corresponding converted Y image signal of the pixel in the frame to be displayed, image signal corresponding to the B sub-pixel is equal to a mixing value of corresponding converted B image signal of the pixel in the frame to be displayed and B image signal in the RGB image signal of the original pixel in the frame to be displayed corresponding to a pixel adjacent to that pixel comprising B sub-pixel in the repeating group, the mixing value may be an average value of them, for example. In other words, in case the two sub-pixels in each pixel of the display panel are arranged in the horizontal direction as shown in FIG. 3*a*, only the image signal corresponding to the B sub-pixel is obtained from both the converted B image signal of the pixel to which the B sub-pixel belongs and B image signal in the RGB image signal of the original pixel corresponding to a pixel adjacent to that pixel comprising the B sub-pixel.

Assuming that image of a frame to be displayed is composed of M*N RGB pixels, since one RG image signal or one BY signal can be obtained from one RGB image signal, M*N RG/BY pixels can be obtained after conversion for M*N RGB pixels, in which M*N/2 RG pixels and M*N/2 BY pixels are included, and the display panel and image of the frame to be displayed can be divided into i*j repeating groups, each of which comprises 2*2 pixels.

In FIG. 3*a*, image signal R_P(i1, j1) and R_P(i2, j2) corresponding to R sub-pixels in the pixel with coordinates (i1, j1) and (i2, j2) may be respectively equal to the corresponding converted R image signal R_O(i1, j1) and R_O(i2, j2) of the pixel in the frame to be displayed. That is, R_P(i1, j1)=R_O(i1, j1), R_P(i2, j2)=R_O(i2, j2).

In FIG. 3*a*, image signal G_P(i1, j1) and G_P(i2, j2) corresponding to G sub-pixels in the pixel with coordinates (i1, j1) and (i2, j2) may be respectively equal to the corresponding converted G image signal G_O(i1, j1) and G_O(i2, j2) of the pixel in the frame to be displayed. That is, G_P(i1, j1)=G_O(i1, j1), G_P(i2, j2)=G_O(i2, j2).

In FIG. 3*a*, image signal Y_P(i1, j2) and Y_P(i2, j1) corresponding to Y sub-pixels in the pixel with coordinates (i1, j2) and (i2, j1) may be respectively equal to the corresponding converted Y image signal Y_O(i1, j2) and Y_O(i2, j1) of the pixel in the frame to be displayed. That is, Y_P(i1, j2)=Y_O(i1, j2), Y_P(i2, j1)=Y_O(i2, j1).

In FIG. 3*a*, image signal B_P(i1, j2) corresponding to a B sub-pixel in the pixel with coordinate (i1, j2) can be equal to the average value of the corresponding converted B image signal B_O(i1, j2) of the pixel in the frame to be displayed and B image signal B(i1, j1) in the RGB image signal of the original pixel corresponding to a neighboring RG pixel, that is, B_P(i1, j2)=(B(i1, j1)+B_O(i1, j2))/2; image signal B_P(i2, j1) corresponding to a B sub-pixel in the pixel with coordinate (i2, j1) can be equal to the average value of the corresponding converted B image signal B_O(i2, j1) of the pixel in the frame to be displayed and B image signal B(i2, j2) in the RGB image signal of the original pixel corresponding to a neighboring RG pixel, that is, B_P(i2, j1)=(B(i2, j2)+B_O(i2, j1))/2.

That is, in case the two sub-pixels in each pixel of the display panel are arranged in horizontal direction, there may be two ways to determine the image signal corresponding to sub-pixels in each pixel of the display panel. One is the image signal corresponding to the sub-pixel is equal to the corresponding converted image signal of the sub-pixel in the frame to be displayed, i.e. the output is directly equal to the input. For example, this is the case for R sub-pixel, G sub-pixel and Y sub-pixel. Another one is having the image signal corresponding to the sub-pixel equaling to a mixing value of the corresponding converted image signal of the sub-pixel in the frame to be displayed and the image signal of the sub-pixel in the original pixel corresponding to a pixel adjacent to that pixel comprising the sub-pixel in the repeating group, i.e. the image signal corresponding to the sub-pixel is obtained by mixing the inputted image signal of respective sub-pixel and the image signal of the sub-pixel in the original pixel corresponding to a pixel adjacent to that pixel comprising the sub-pixel, for example, this is the case for the B sub-pixel.

Figure 4A:
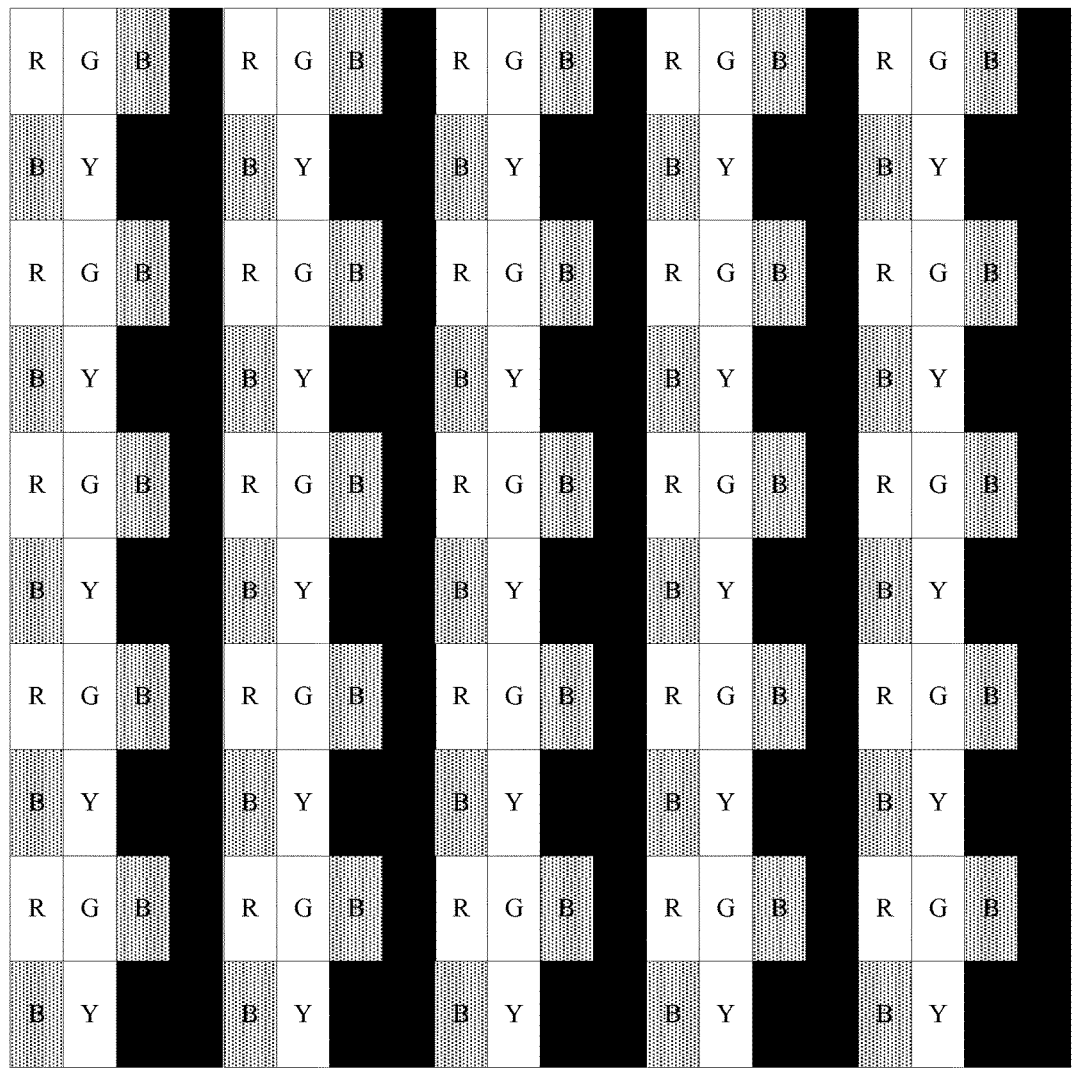
FIG. 4*a* is a detail diagram for black-white lines when image is displayed using the pixel arrangement shown in FIG. 3*a*.

When complex picture is displayed by the pixel arrangement shown in FIG. 3*a*, the display effect may still satisfy requirement for viewing. Further, from the test of black-white line for such pixel arrangement, black-white line details may still ensure resolution, as shown in FIG. 4*a*.

Second, in the case where the two sub-pixels in each pixel of the display panel are arranged in a diagonal direction as shown in FIG. 3*b*, in the pixel composed of a R sub-pixel and a G sub-pixel of each repeating group, image signal corresponding to the G sub-pixel is equal to corresponding converted G image signal of the pixel in the frame to be displayed, image signal corresponding to R sub-pixel is equal to the mixing value of the corresponding converted R image signal of the pixel in the frame to be displayed and R image signal in the RGB image signal of the original pixel in the frame to be displayed corresponding to a pixel adjacent to that pixel comprising the R sub-pixel in the repeating group, for example, the mixing value may be the average value of them. In the pixel composed of a B sub-pixel and a Y sub-pixel of each repeating group, image signal corresponding to the Y sub-pixel is equal to corresponding to converted Y image signal of the pixel in the frame to be displayed, image signal corresponding to the B sub-pixel is equal to the mixing value of the corresponding converted B image signal of the pixel in the frame to be displayed and B image signal in the RGB image signal of the original pixel in the frame to be displayed corresponding to a pixel adjacent to that pixel comprising the B sub-pixel in the repeating group, for example, the mixing value may be the average value of them. That is, in case the two sub-pixels in each pixel of the display panel are arranged in a diagonal direction as shown in FIG. 3b, each of the B image signal corresponding to the B sub-pixel and the R image signal corresponding to the R sub-pixel is obtained by simultaneously using the B image signal or R image signal of the pixel to which they belong to and the B image signal or R image signal of the original pixel corresponding to a pixel adjacent to that pixel comprising the B sub-pixel or R sub-pixel.

Assuming that image of a frame to be displayed is composed of M*N RGB pixels, since one RG image signal or one BY signal can be obtained from one RGB image signal, M*N RG/BY pixels can be obtained after conversion for M*N RGB pixels, in which M*N/2 RG pixels and M*N/2 BY pixels are included, and the display panel and image of the frame to be displayed can be divided into i*j repeating groups, each of which comprises 2*2 pixels.

For example, in FIG. 3b, image signal R_P(i1, j1) corresponding to a R sub-pixel in the pixel with coordinate (i1, j1) is equal to the average value of the corresponding converted R image signal R_O(i1, j1) of the pixel in the frame to be displayed and R image signal R(i1, j2) in the RGB image signal of the original pixel corresponding to a neighboring pixel BY, that is, R_P(i1, j1)=(R(i1, j2)+R_O(i1, j1))/2, image signal R_P(i2, j2) corresponding to a R sub-pixel in the pixel with coordinate (i2, j2) is equal to the average value of the corresponding converted R image signal R_O(i2, j2) of the pixel in the frame to be displayed and R image signal R(i2, j1) in the RGB image signal of the original pixel corresponding to a neighboring pixel BY, that is, R_P(i2, j2)=(R(i2, j1)+R_O(i2, j2))/2.

In FIG. 3b, image signal G_P(i1, j1) and G_P(i2, j2) corresponding to G sub-pixels with coordinates (i1, j1) and (i2, j2) are respectively equal to corresponding converted G image signal G_O(i1, j1) and G_O(i2, j2) of pixels in the frame to be displayed, that is, G_P(i1, j1)=G_O(i1, j1), G_P(i2, j2)=G_O(i2, j2).

In FIG. 3b, image signal Y_P(i1, j2) and Y_P(i2, j1) corresponding to Y sub-pixels with coordinates (i1, j2) and (i2, j1) are respectively equal to the corresponding converted Y image signal Y_O(i1, j2) and Y_O(i2, j1) of pixels in the frame to be displayed, that is, Y_P(i1, j2)=Y_O(i1, j2), Y_P(i2, j1)=Y_O(i2, j1).

In FIG. 3b, image signal B_P(i1, j2) corresponding to a B sub-pixel in the pixel with coordinate (i1, j2) is equal to the average value of corresponding converted B image signal B_O(i1, j2) of the pixel in the frame to be displayed and B image signal B(i1, j1) in the RGB image signal of the original pixel corresponding to a neighboring pixel RG, that is, B_P(i1, j2)=(B(i1, j1)+B_O(i1, j2))/2, image signal B_P(i2, j1) corresponding to a B sub-pixel in the pixel with coordinate (i2, j1) is equal to the average value of corresponding converted B image signal B_O(i2, j1) of the pixel in the frame to be displayed and B image signal B(i2, j2) in the RGB image signal of the original pixel corresponding to a neighboring pixel RG, that is, B_P(i2, j1)=(B(i2, j2)+B_O(i2, j1))/2.

In other words, in case the two sub-pixels in each pixel of the display panel are arranged in a diagonal direction, there may be two ways of determining the image signal corresponding to sub-pixels in each pixel of the display panel. One is the image signal corresponding to the sub-pixel is equal to the corresponding converted image signal of the sub-pixel in the frame to be displayed, i.e. the output is directly equal to the input. For example, this is the case for the G sub-pixel and the Y sub-pixel. Another one is having the image signal corresponding to the sub-pixel equaling to a mixing value of the corresponding converted image signal of the sub-pixel in the frame to be displayed and the image signal of the sub-pixel in the original pixel corresponding to a pixel adjacent to that pixel comprising the sub-pixel in the repeating group, i.e. the image signal corresponding to the sub-pixel is obtained by mixing the inputted image signal of respective sub-pixel and the image signal of the sub-pixel in the original pixel corresponding to a pixel adjacent to that pixel comprising the sub-pixel, for example, this is the case for the R sub-pixel and the B sub-pixel.

Figure 4B:
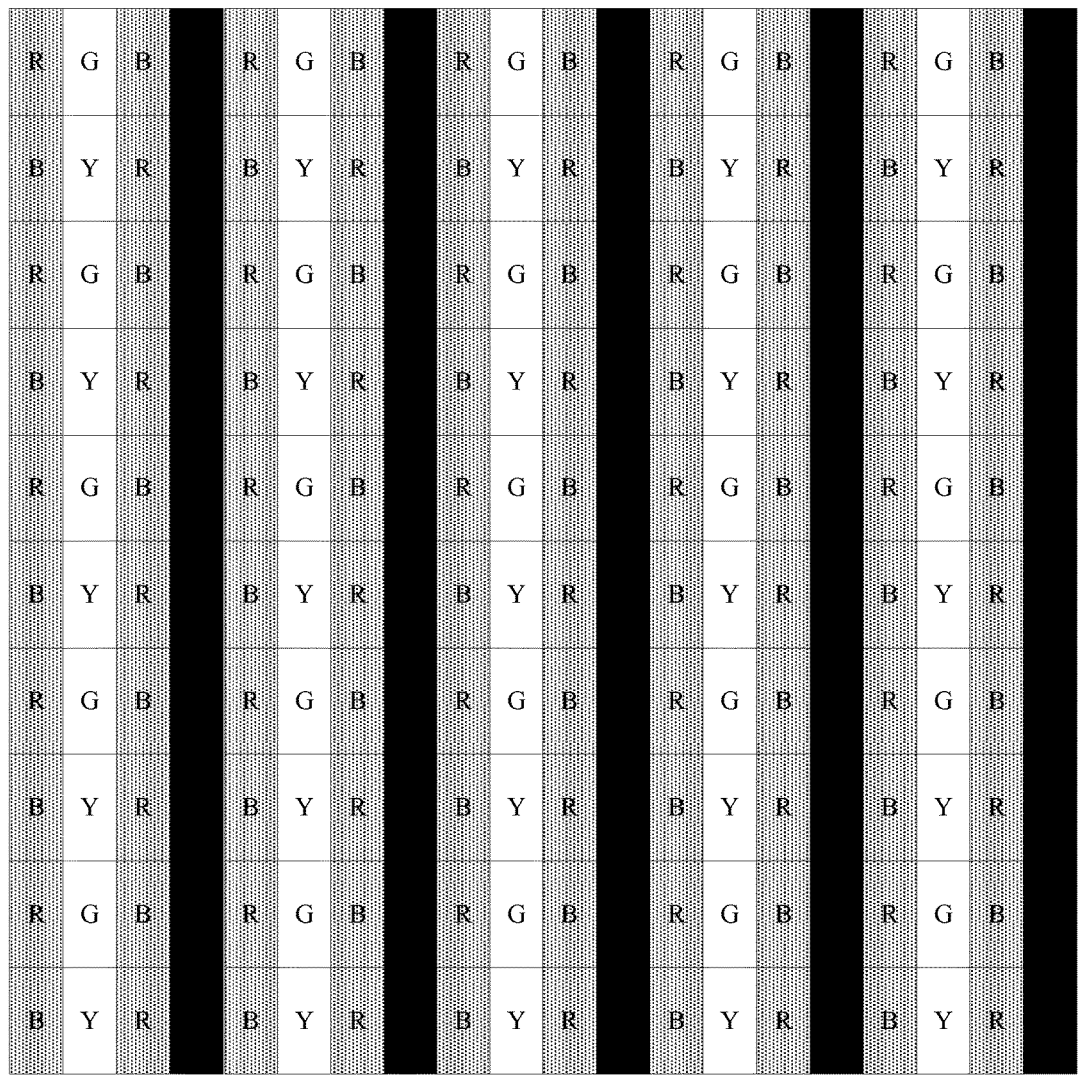
FIG. 4*b* is a detail diagram for black-white lines when image is displayed using the pixel arrangement shown in FIG. 3*b*.

When a complex picture is displayed using the pixel arrangement shown in FIG. 3b, the display effect still satisfies requirement for viewing. Further, from the test of black-white line for such pixel arrangement, black-white line details may still ensure resolution, as shown in FIG. 4b.

Based on the same inventive concept, a device for displaying image is also provided by an embodiment of the invention, for the principle to solve problems by the device is similar to that of the method for displaying image mentioned above, implementation of such device can be referred to that of the method above, and repetition will not be described in detail herein.

Figure 5:
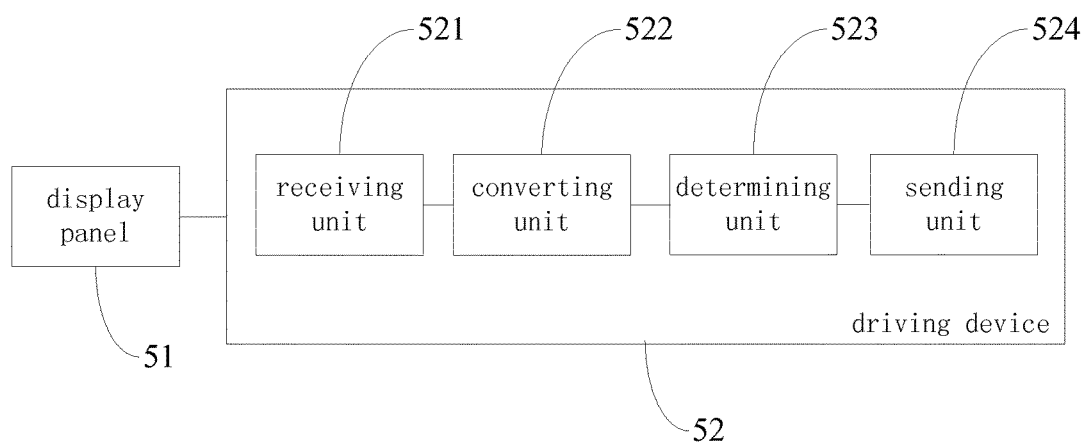
FIG. 5 is a schematic diagram of a structure of a display device provided by an embodiment of the invention.

Another embodiment of the invention provides a display device comprising a display panel 51 and a driving device 52 as shown in FIG. 5, wherein in the display panel 51, 2*2 pixels constitute a repeating group, each repeating group contains two pixels composed of a B sub-pixel and a Y sub-pixel, and two pixels composed of a R sub-pixel and a G sub-pixel, and sub-pixels included in neighboring pixels in the horizontal or vertical direction are different.

The driving device 52 comprises: a receiving unit 521 configured to receive a RGB image signal of each pixel in a frame to be displayed; a converting unit 522 configured to convert the received RGB image signal of each pixel in the frame to be displayed into a corresponding RG/BY image signal respectively; a determining unit 523 configured to determine the image signal corresponding to sub-pixels in each pixel of the display panel based on the RG/BY image signal corresponding to each pixel of the frame to be displayed depending on arrangement of sub-pixels in each pixel of the display panel; a sending unit 524 configured to send the determined image signal corresponding to sub-pixels in each pixel of the display panel to the display panel for displaying.

In specific implementation, the converting unit 522 in the display device provided by the embodiment of the invention can be used for computing the RG/BY image signal by following formulas:

$$R\_O=R, \ G\_O=G, \ B\_O=B, \ Y\_O=\min(R,G);$$

wherein R represents a value of the received R image signal of each pixel of the frame to be displayed; G represents a value of the received G image signal of each pixel of the frame to be displayed; B represents a value of the received B image signal of each pixel of the frame to be displayed; R_O represents a value of the converted R image signal of each pixel, G_O represents a value of the converted G image signal of each pixel, B_O represents a value of the converted B image signal of each pixel, Y_O represents a value of the converted Y image signal of each pixel.

In specific implementation, in the display device provided by embodiments of the invention, the two sub-pixels in each pixel in the display panel 51 may be arranged in a horizontal direction or a diagonal direction.

In specific implementation, in the display device provided by embodiments of the invention, if the two sub-pixels in each pixel in the display panel 51 are arranged in the horizontal direction, the determining unit 523 may determine the image signal corresponding to sub-pixels in each pixel of the display panel as follows: in the pixel composed of a R sub-pixel and a G sub-pixel in each repeating group, image signal corresponding to the R sub-pixel is equal to the corresponding converted R image signal of the pixel in the frame to be displayed, image signal corresponding to the G sub-pixel is equal to the corresponding converted G image signal of the pixel in the frame to be displayed. In the pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel.

In specific implementation, in the display device provided by embodiments of the invention, if the two sub-pixels in each pixel in the display panel 51 are arranged in a diagonal direction, the determining unit 523 determines the image signal corresponding to sub-pixels in each pixel of the display panel as follows: in the pixel composed of a R sub-pixel and a G sub-pixel in each repeating group, image signal corresponding to the G sub-pixel is equal to corresponding converted G image signal of the pixel in the frame to be displayed, image signal corresponding to the R sub-pixel is equal to the mixing value of corresponding converted R image signal of the pixel in the frame to be displayed and R image signal in the RGB image signal of the original pixel in the frame to be displayed corresponding to an pixel adjacent to that pixel comprising the R sub-pixel in the repeating group. In the pixel composed of a B sub-pixel and a Y sub-pixel in each repeating group, image signal corresponding to the Y sub-pixel is equal to corresponding converted Y image signal of the pixel in the frame to be displayed, image signal corresponding to the B sub-pixel is equal to the mixing value of corresponding converted B image signal of the pixel in the frame to be displayed and R image signal in the RGB image signal of the original pixel in the frame to be displayed corresponding to a pixel adjacent to that pixel comprising the B sub-pixel in the repeating group.

From the above description of embodiments of the invention, it is clear to the skilled in the art that embodiments of the invention can be implemented in hardware or by means of software plus necessary general purpose hardware platform. With such understanding, technical solutions of embodiments of the invention can by embodied in software production, which may be stored on a non-volatile storage medium (such as CD-ROM, USB flash disc, mobile hard disk, etc.), and comprise a number of instructions to cause one computer device (such as personal computer, server, or network device, etc.) to perform the method described in embodiments of the invention.

It can be understood by the skilled person in the art that accompanying drawings are just schematic diagrams for several preferred embodiments, modules or flow in the figures are not necessarily essential to embodiments of the invention.

It can be understood by the skilled person in the art that modules in devices of embodiments can be distributed in accordance with the description of the embodiments, and can also be distributed in one or more devices after modification that are different from those embodiments. Modules of above embodiments may be integrated into one module, and can also be divided into multiple sub-modules.

Number of embodiments is just for description, and not represents advantages or disadvantages of embodiments.

Moreover, it is noted that, the term "horizontal direction" or "vertical direction" mentioned in the description are not intended to restrict a fixed direction or orientation, the "horizontal direction" or "vertical direction" may be described with respect to different reference direction. For example, "horizontal direction" in a lateral coordinate may correspond to "vertical direction" in a longitudinal coordinate, and vice versa.

In the above method for displaying image and display device provided by embodiments of the invention, based on Hering color opponent-process theory, two pixels are constituted using four kinds of color: red(R), green(G), blue(B) and yellow(Y). And since in the display panel, the repeating group is constituted by 2*2 pixels, each repeating group contains two pixels composed of a B sub-pixel and a Y sub-pixel and two pixels composed of a R sub-pixel and a G sub-pixel, and sub-pixels included in neighboring pixels in the horizontal or vertical direction within the repeating group are different, thus compared to the existing arrangement in which three or more sub-pixels constitute one pixel, the number of sub-pixels in each pixel is reduced, enabling the resolution of image displayed to be enhanced under the same fabrication precision. And after converting the received RGB image signal of each pixel of the frame to be displayed into corresponding RG/BY image signal respectively, depending on arrangement of sub-pixels in each pixel of the display panel, image signal corresponding to sub-pixels of each pixel in the display panel is determined based on the RG/BY image signal corresponding to each pixel of the frame to be displayed, then the image is displayed, therefore, normal display can be ensured, image of the frame to be displayed can be rendered better.

Apparently, various modifications and variances for embodiments of the invention can be effected without departing the spirit and scope of the invention. Thus, if such modifications and variances fall within the scope of the appending claims and equivalents thereof, it is intended that these modifications and variances are included by the invention.

The invention claimed is:

1. A method for displaying image, comprising:
converting a RGB image signal of each pixel of a frame to be displayed into a corresponding RGBY image signal respectively; calculating an image signal corresponding to sub-pixels in each pixel of a display panel based on the RGBY image signal corresponding to each pixel of the frame to be displayed and an arrangement of sub-pixels in each pixel of the display panel; wherein in the display panel, 2*2 pixels constitute a repeating group, each repeating group is composed of two first pixels and two second pixels, each first pixel being composed of a B sub-pixel and a Y sub-pixel, each second pixel being composed of a R sub-pixel and a G sub-pixel, wherein neighboring pixels in horizontal and vertical directions in the repeating group have different sub-pixels; transmitting the image signal corresponding to sub-pixels in each pixel of the display panel to the display panel, wherein the step of converting the RGB image signal of each pixel of a frame to be displayed into corresponding RGBY image signal respectively comprises: computing the RGBY image signal by the following formulas: R_O=R, G_O=G, B_O=B, Y_O=min(R, G); wherein R represents a value of an R image signal of each pixel of the frame to be displayed; G represents a value of a G image signal of each pixel of the frame to be displayed; B represents a value of a B image signal of each pixel of the frame to be displayed; R represents a value of a converted R image signal of each pixel, G_O represents a value of a converted G image signal of each pixel, B_O represents a value of a converted B image signal of each pixel, Y_O represents a value of a converted Y image signal of each pixel, and min(R, G) represents a minimum of the value of the R image signal and the value of the G image signal, wherein the two sub-pixels in each pixel of the display panel are arranged in a horizontal direction, the step of calculating image signal corresponding to sub-pixels in each pixel of a display panel based on the RGBY image signal corresponding to each pixel of the frame to be displayed comprises: in the second pixel composed of a R sub-pixel and a G sub-pixel of each repeating group, image signal corresponding to the R sub-pixel equals to corresponding converted R image signal of the pixel in the frame to be displayed, image signal corresponding to the G sub-pixel equals to corresponding converted G image signal of the pixel in the frame to be displayed; in the first pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to the pixel comprising the B sub-pixel in the repeating group.

2. A method for displaying image, comprising:
converting a RGB image signal of each pixel of a frame to be displayed into a corresponding RGBY image signal respectively; calculating an image signal corresponding to sub-pixels in each pixel of a display panel based on the RGBY image signal corresponding to each pixel of the frame to be displayed and an arrangement of sub-pixels in each pixel of the display panel; wherein in the display panel, 2*2 pixels constitute a repeating group, each repeating group is composed of two first pixels and two second pixels, each first pixel being composed of a B sub-pixel and a Y sub-pixel, each second pixel being composed of a R sub-pixel and a G sub-pixel, wherein neighboring pixels in horizontal and vertical directions in the repeating group have different sub-pixels; transmitting the image signal corresponding to sub-pixels in each pixel of the display panel to the display panel, wherein the step of converting the RGB image signal of each pixel of a frame to be displayed into corresponding RGBY image signal respectively comprises: computing the RGBY image signal by the following formulas: R_O=R, G_O=G, B_O=B, Y_O=min(R, G); wherein R represents a value of an R image signal of each pixel of the frame to be displayed; G represents a value of a G image signal of each pixel of the frame to be displayed; B represents a value of a B image signal of each pixel of the frame to be displayed; R_O represents a value of a converted R image signal of each pixel, G_O represents a value of a converted G image signal of each pixel, B_O represents a value of a converted B image signal of each pixel, Y_O represents a value of a converted Y image signal of each pixel, and min(R, G) represents a minimum of the value of the R image signal and the value of the G image signal, wherein the two sub-pixels in each pixel of the display panel are arranged in a diagonal direction, the step of calculating image signal corresponding to sub-pixels in each pixel of a display panel based on the RGBY image signal corresponding to each pixel of the frame to be displayed comprises: in the second pixel composed of a R sub-pixel and a G sub-pixel of each repeating group, image signal corresponding to the G sub-pixel equals to corresponding converted G image signal of the pixel in the frame to be displayed, image signal corresponding to the R sub-pixel equals to a mixing value of corresponding converted R image signal of the pixel in the frame to be displayed and R image signal in the RGB image signal of the original pixel in the frame to be displayed corresponding to a pixel adjacent to the pixel comprising the R sub-pixel in the repeating group; in the first pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to the pixel comprising the B sub-pixel in the repeating group.

3. A display device comprising a display panel and a driving device, wherein in the display panel, 2*2 pixels constitute a repeating group, each repeating group is composed of two first pixels and two second pixels, each first pixel being composed of a B sub-pixel and a Y sub-pixel, each second pixel being composed of a R sub-pixel and a G sub-pixel, wherein neighboring pixels in horizontal and vertical directions in the repeating group have different sub-pixels, the driving device comprises:
a receiver for receiving a RGB image signal of each pixel of a frame to be displayed;
a converter for converting the RGB image signal of each pixel of the frame to be displayed into a corresponding RGBY image signal respectively;
a calculator for calculating an image signal corresponding to sub-pixels in each pixel of the display panel based on the RGBY image signal corresponding to each pixel of the frame to be displayed and an arrangement of sub-pixels in each pixel of the display panel;
a transmitter for transmitting the image signal corresponding to sub-pixels in each pixel of the display panel to the display panel,
wherein the converter is configured to compute the RGBY image signal by the following formulas:

$$R\_O=R,\ G\_O=G,\ B\_O=B,\ Y\_O=\min(R,G);$$

wherein R represents a value of an R image signal of each pixel of the frame to be displayed; G represents a value of a G image signal of each pixel of the frame to be displayed; B represents a value of a B image signal of each pixel of the frame to be displayed; R_O represents a value of a converted R image signal of each pixel, G_O represents a value of a converted G image signal of each pixel, B_O represents a value of a converted B image signal of each pixel, Y_O represents a value of a converted Y image signal of each pixel, and min(R, G) represents a minimum of the value of the R image signal and the value of the G image signal, wherein the two sub-pixels in each pixel of the display panel are arranged in a horizontal direction, the calculator calculates the image signal corresponding to sub-pixels in each pixel of the display panel as follows:

in the second pixel composed of a R sub-pixel and a G sub-pixel of each repeating group, image signal corresponding to the R sub-pixel equals to corresponding converted R image signal of the pixel in the frame to be displayed, image signal corresponding to the G sub-pixel equals to corresponding converted G image signal of the pixel in the frame to be displayed;

in the first pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel in the repeating group.

4. A display device comprising a display panel and a driving device, wherein in the display panel, 2*2 pixels constitute a repeating group, each repeating group is composed of two first pixels and two second pixels, each first pixel being composed of a B sub-pixel and a Y sub-pixel, each second pixel being composed of a R sub-pixel and a G sub-pixel, wherein neighboring pixels in horizontal and vertical directions in the repeating group have different sub-pixels, the driving device comprises:

a receiver for receiving a RGB image signal of each pixel of a frame to be displayed;

a converter for converting the RGB image signal of each pixel of the frame to be displayed into a corresponding RGBY image signal respectively;

a calculator for calculating an image signal corresponding to sub-pixels in each pixel of the display panel based on the RGBY image signal corresponding to each pixel of the frame to be displayed and an arrangement of sub-pixels in each pixel of the display panel;

a transmitter for transmitting the image signal corresponding to sub-pixels in each pixel of the display panel to the display panel, wherein the converter is configured to compute the RGBY image signal by the following formulas:

$R\_O=R, G\_O=G, B\_O=B, Y\_O=\min(R,G)$;

wherein R represents a value of an R image signal of each pixel of the frame to be displayed; G represents a value of a G image signal of each pixel of the frame to be displayed; B represents a value of a B image signal of each pixel of the frame to be displayed; R_O represents a value of a converted R image signal of each pixel, G_O represents a value of a converted G image signal of each pixel B_O represents a value of a converted B image signal of each pixel, Y_O represents a value of a converted Y image signal of each pixel, and min(R, G) represents a minimum of the value of the R image signal and the value of the G image signal, wherein the two sub-pixels in each pixel of the display panel are arranged in a diagonal direction, the calculator calculates the image signal corresponding to sub-pixels in each pixel of the display panel as follows:

in the second pixel composed of a R sub-pixel and a G sub-pixel of each repeating group, image signal corresponding to the G sub-pixel equals to corresponding converted G image signal of the pixel in the frame to be displayed, image signal corresponding to the R sub-pixel equals to a mixing value of corresponding converted R image signal of the pixel in the frame to be displayed and R image signal in the RGB image signal of the original pixel in the frame to be displayed corresponding to a pixel adjacent to that pixel comprising the R sub-pixel in the repeating group;

in the first pixel composed of a B sub-pixel and a Y sub-pixel of each repeating group, image signal corresponding to the Y sub-pixel equals to corresponding converted Y image signal of the pixel in the frame to be displayed, image signal corresponding to the B sub-pixel equals to a mixing value of corresponding converted B image signal of the pixel in the frame to be displayed and B image signal in the RGB image signal of the original pixel in the frame to be displayed corresponding to a pixel adjacent to that pixel comprising the B sub-pixel in the repeating group.

* * * * *